United States Patent
Bui et al.

(10) Patent No.: US 9,552,841 B2
(45) Date of Patent: *Jan. 24, 2017

(54) MAGNETIC TAPE SERVO FORMAT ALLOWING FOR INCREASED LINEAR TAPE DENSITY AND SYSTEMS THEREOF

(71) Applicant: International Business Machines Corporation, Armonk, NY (US)

(72) Inventors: Nhan X. Bui, Tucson, AZ (US); Giovanni Cherubini, Rueschlikon (CH); Evangelos S. Eleftheriou, Rueschlikon (CH); Reed A. Hancock, Tucson, AZ (US); Robert A. Hutchins, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 435 days.

This patent is subject to a terminal disclaimer.

(21) Appl. No.: 13/862,278

(22) Filed: Apr. 12, 2013

(65) Prior Publication Data

US 2013/0222940 A1 Aug. 29, 2013

Related U.S. Application Data

(63) Continuation of application No. 12/691,604, filed on Jan. 21, 2010, now Pat. No. 8,446,684.

(51) Int. Cl.
*G11B 21/10* (2006.01)
*G11B 5/584* (2006.01)
*G11B 15/18* (2006.01)

(52) U.S. Cl.
CPC .............. *G11B 21/103* (2013.01); *G11B 5/584* (2013.01); *G11B 15/18* (2013.01)

(58) Field of Classification Search
CPC ....... G11B 21/103; G11B 5/584; G11B 15/18; G11B 5/00813; G11B 20/1201
(Continued)

(56) References Cited

U.S. PATENT DOCUMENTS 6,029,895 A 2/2000 Ito et al.
6,038,108 A 3/2000 Dee et al.
(Continued)

OTHER PUBLICATIONS

Notice of Allowance and Fee(s) Due from U.S. Appl. No. 12/691,604 dated Jan. 17, 2013.
(Continued)

*Primary Examiner* — Fred Tzeng
(74) *Attorney, Agent, or Firm* — Zilka-Kotab, PC

(57) ABSTRACT

In one general embodiment, a magnetic recording tape includes a plurality of servo tracks, each servo track comprising a series of magnetically defined bars, wherein an average stripe width of the bars is between about 1.0 micron and about 2.2 microns, where an average servo frame length of groups of the bars comprising a servo frame is between about 120 microns and about 180 microns. In another general embodiment, a system includes a head having at least one servo reader and an array of data transducers of a type selected from a group consisting of readers and writers; and a controller operative to selectively enable every other transducer of a particular type in the array in a first mode of operation, and operative to selectively enable every transducer of the particular type in the array in a second mode of operation.

20 Claims, 5 Drawing Sheets

(58) Field of Classification Search
USPC .......................................................... 360/48
See application file for complete search history.

(56) References Cited

U.S. PATENT DOCUMENTS

| | | |
|---|---|---|
| 6,496,329 B2 | 12/2002 | Hungerford et al. |
| 7,158,338 B2 | 1/2007 | Koski et al. |
| 7,193,812 B2 | 3/2007 | Eaton |
| 7,245,453 B2 | 7/2007 | Koski et al. |
| 7,382,569 B2 | 6/2008 | Biskeborn et al. |
| 7,522,371 B2 | 4/2009 | Koski et al. |
| 7,522,372 B2 | 4/2009 | Koski et al. |
| 7,791,834 B2 | 9/2010 | Biskeborn et al. |
| 7,864,487 B2 | 1/2011 | Cherubini et al. |
| 7,881,008 B2 | 2/2011 | Cherubini et al. |
| 8,446,684 B2* | 5/2013 | Bui ................. G11B 5/584 360/48 |
| 8,913,340 B2 | 12/2014 | Biskeborn et al. |
| 2005/0052778 A1* | 3/2005 | Bui ................. G11B 5/584 360/77.12 |
| 2007/0217078 A1 | 9/2007 | Neumann et al. |
| 2008/0037154 A1 | 2/2008 | Biskeborn et al. |
| 2009/0059415 A1 | 3/2009 | Hara et al. |
| 2009/0073604 A1 | 3/2009 | Johnson et al. |
| 2009/0147395 A1 | 6/2009 | McKinstry et al. |
| 2009/0213493 A1 | 8/2009 | Bui et al. |
| 2009/0316290 A1 | 12/2009 | Biskeborn et al. |
| 2011/0176237 A1 | 7/2011 | Bui et al. |

OTHER PUBLICATIONS

Stern et al., "Process for Making Interleaved Magnetic Head," IPCOM000110063D, Oct. 1, 1992, IBM Technical Disclosure Bulletin, vol. 35, No. 5, pp. 304.
Bui et al. U.S. Appl. No. 12/691,604, filed Jan. 21, 2010.
Cherubini et al., U.S. Appl. No. 12/117,899, filed May 9, 2008.
Cherubini et al., U.S. Appl. No. 12/118,251, filed May 9, 2008.

* cited by examiner

MAGNETIC TAPE SERVO FORMAT ALLOWING FOR INCREASED LINEAR TAPE DENSITY AND SYSTEMS THEREOF

RELATED APPLICATIONS

This application is a continuation of U.S. patent application Ser. No. 12/691,604 filed Jan. 21, 2010, and which is herein incorporated by reference.

BACKGROUND

As tape capacity increases with each generation, smaller and smaller track spacing is being demanded along with tighter Track MisRegistration (TMR) requirements and increased linear density such that tape capacity can be effectively increased without an accompanying loss in data integrity.

As this occurs, the Tape Dimensional Stability (TDS) of the tape medium itself becomes more of a factor in the TMR budget. This TDS factor can be mitigated by improving the media properties, e.g., controlling the temperature, humidity, and tension environments, and by minimizing the overall track spacing as written by the head in a single pass.

Therefore, a magnetic tape with reduced overall track spacing that mitigates the TDS factor would be beneficial to the field of magnetic tapes and magnetic tape data writing and/or reading.

SUMMARY

A magnetic recording tape according to one embodiment includes a plurality of servo tracks, each servo track comprising a series of magnetically defined bars, wherein an average stripe width of the bars is between about 1.0 micron and about 2.2 microns, where an average servo frame length of groups of the bars comprising a servo frame is between about 120 microns and about 180 microns.

A system according to one embodiment includes a head having at least one servo reader and an array of data transducers of a type selected from a group consisting of readers and writers; and a controller operative to selectively enable every other transducer of a particular type in the array in a first mode of operation, and operative to selectively enable every transducer of the particular type in the array in a second mode of operation.

A method for writing and/or reading data on a magnetic tape, according to one embodiment, includes reading at least one of a plurality of servo tracks on the magnetic tape, the servo tracks each comprising a set of magnetically defined bars, the magnetically defined bars having: an average stripe width of the bars of between about 1.0 micron and about 2.2 microns; and an average servo frame length of groups of the bars comprising a servo frame of between about 120 microns and about 180 microns.

Other aspects and embodiments of the present invention will become apparent from the following detailed description, which, when taken in conjunction with the drawings, illustrate by way of example the principles of the invention.

DETAILED DESCRIPTION

Figure 1:
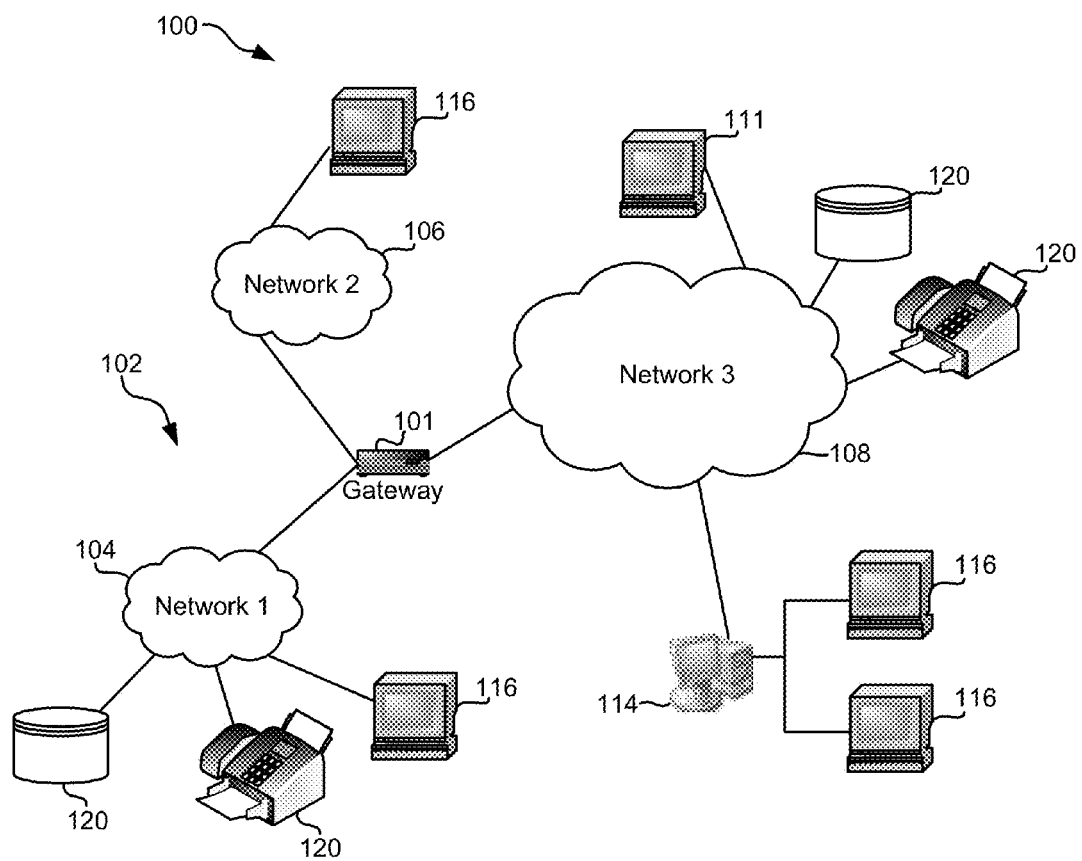
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic recording tape includes a plurality of servo tracks, each servo track comprising a series of magnetically defined bars, wherein an average stripe width of the bars is between about 1.0 micron and about 2.2 microns, where an average servo frame length of groups of the bars comprising a servo frame is between about 120 microns and about 180 microns.

In another general embodiment, a system includes a head having at least one servo reader and an array of data transducers of a type selected from a group consisting of readers and writers; and a controller operative to selectively enable every other transducer of a particular type in the array in a first mode of operation, and operative to selectively enable every transducer of the particular type in the array in a second mode of operation.

In yet another general embodiment, a method for writing and/or reading data on a magnetic tape includes reading at least one of a plurality of servo tracks on the magnetic tape, the servo tracks each comprising a set of magnetically defined bars, the magnetically defined bars having: an average stripe width of the bars of between about 1.0 micron and about 2.2 microns; and an average servo frame length of groups of the bars comprising a servo frame of between about 120 microns and about 180 microns.

As will be appreciated by one skilled in the art, the present invention may be embodied as a system, method or computer program product. Accordingly, the present invention may take the form of an entirely hardware embodiment, a software embodiment (including firmware, resident software, micro-code, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
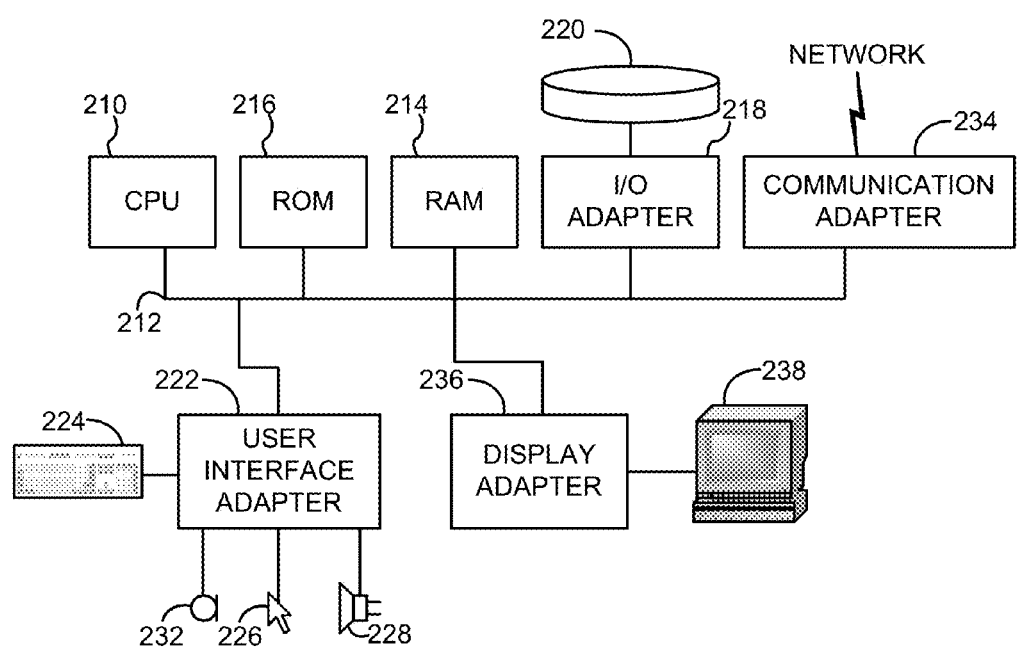
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In existing tape formats, a single host, which may be any type of computing device or application, writes to the tape one wrap at a time. A wrap is a collection of related tracks that are written or read simultaneously by a tape drive head. A tape drive head has several read elements and write elements, which may be present on a single or multiple modules. A track is the data written by a single write element and read by a single read element. For example, a 16-channel head typically has 16 write elements and 16 read elements associated with each travel direction. During a write, the head may write 16 tracks in parallel. During a read, the head may read 16 tracks in parallel. The group of 16 simultaneously accessed tracks comprises a wrap.

EMBODIMENTS

According to some embodiments, a method to mitigate the TDS factor by reducing the overall track spacing of each write and read pass of the head on the tape is described. This is accomplished, in some approaches, by introducing a new tape servo format, a new data track pattern, a new read/write head, and/or a new write, read, and servo method. These new introductions allow the TDS value to be significantly reduced, and in some approaches cut about in half, and thus relieves the TMR budget on the magnetic tape so that the track spacing can be reduced allowing for more tracks, thereby increasing the capacity on the magnetic tape cartridge. The TDS portion of the TMR budget is typically 15% to 20% of tape capacity and without the reduction, it consumes a larger portion as track density on the magnetic tape increases.

A new servo format is proposed herein, and has a shorter servo pattern height, increased servo pattern stripe angle, and scaled stripe width and spacing to improve the sampling rates with minimum changes to current electronics and code. This new pattern allows for more space between servo patterns to place data tracks and higher resolution track-following servo control. This is done, in one approach, by reducing the servo pattern height from 186 μm to 93 μm, in addition to modifying other key parameters.

Figure 3:
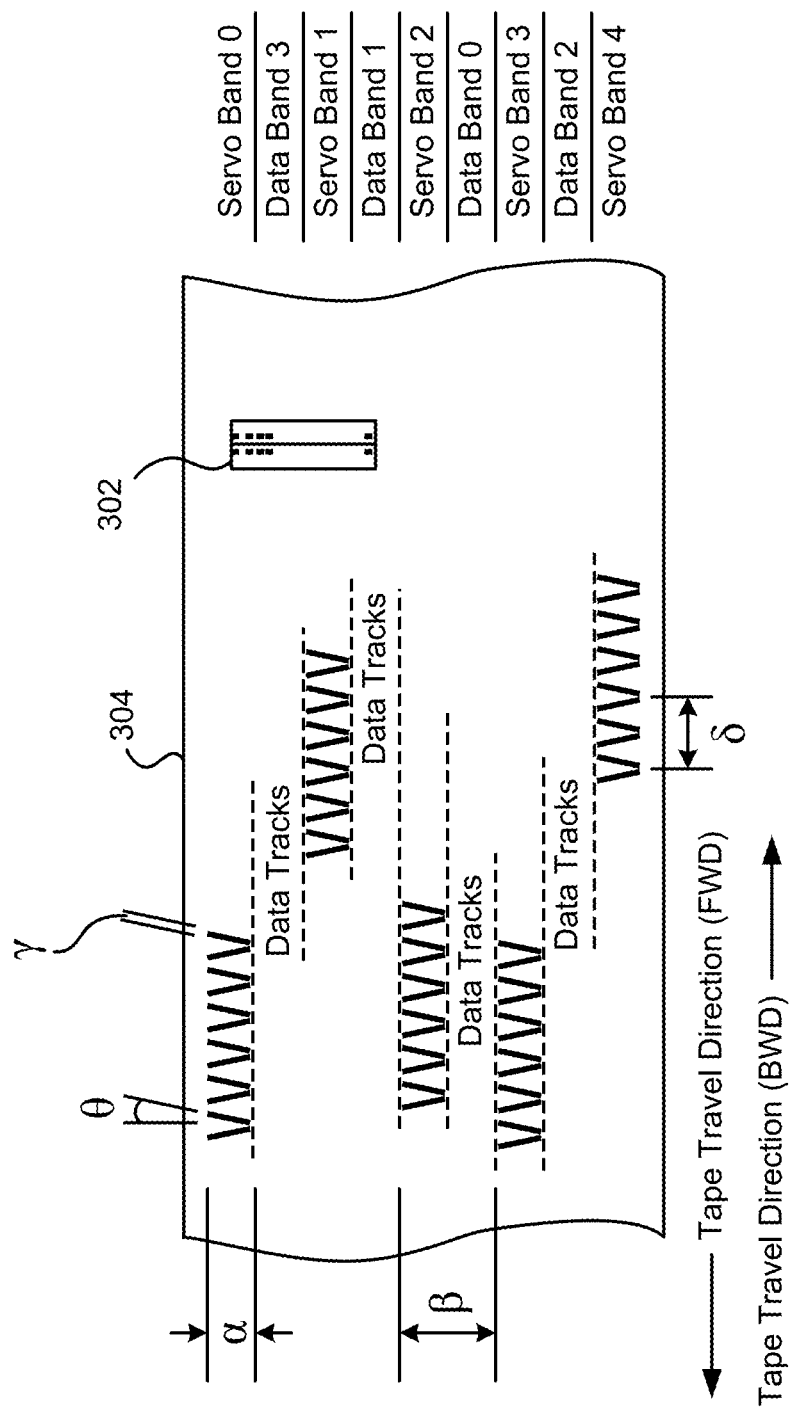
FIG. 3 depicts a simplified schematic diagram of a magnetic head, servo patterns, and magnetic tape, according to one embodiment.

Now referring to FIG. 3, according to one embodiment, several new dimensions are presented. The magnetic tape 304 travels in the direction indicated near the bottom of the tape 304, and the magnetic head 302 is positioned as shown. One new servo format parameter is a servo band height a of between about 80 μm and about 120 μm, such as about 93 μm. Some other new servo parameters include a servo stripe angle θ of between about 10° and about 25°, such as about 12°; a stripe width γ of between about 1.0 μm and about 2.2 μm, such as about 1.26 μm; and a servo frame length δ of between about 120 μm and about 180 μm, such as about 152 μm. The servo band pitch β may be determined based on the data track width. A preferred about 12° stripe angle θ provides greater positional resolution on the servo pattern that can increase the number of tracks, according to some embodiments. The changes to the stripe width γ and pattern length δ allow for improved sampling rate of the servo pattern, according to some approaches.

In Linear Tape Open (LTO), the adjacent servo patterns are shifted in the longitudinal directions to enable detecting which databand is being accessed. In some approaches, such as the 3592 format, the databand information may be written into the LPOS data. This new servo format allows either method to be used at the time of servo writing. However, it is felt that the encode method is more reliable and preferable.

Figure 4:
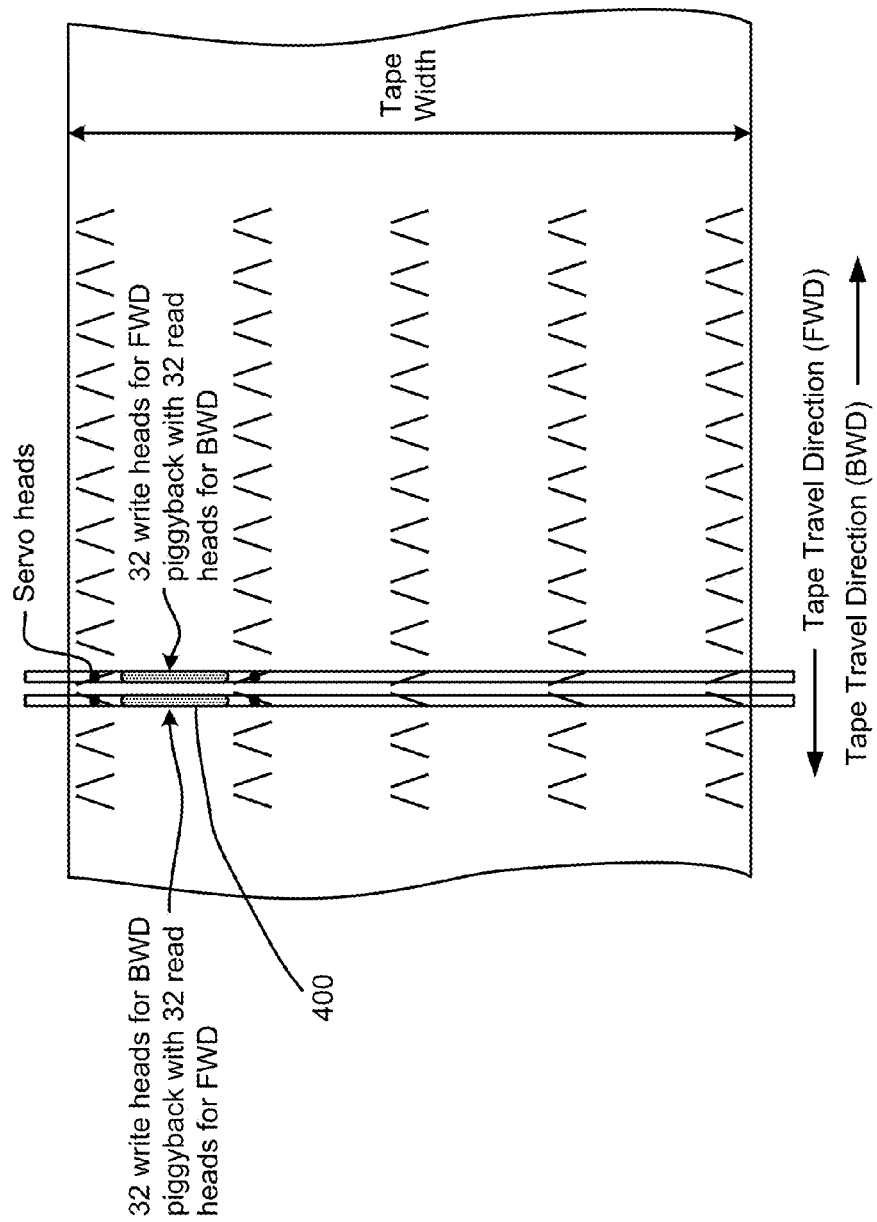
FIG. 4 depicts a simplified schematic diagram of magnetic head and servo pattern according to one embodiment.
Figure 5:
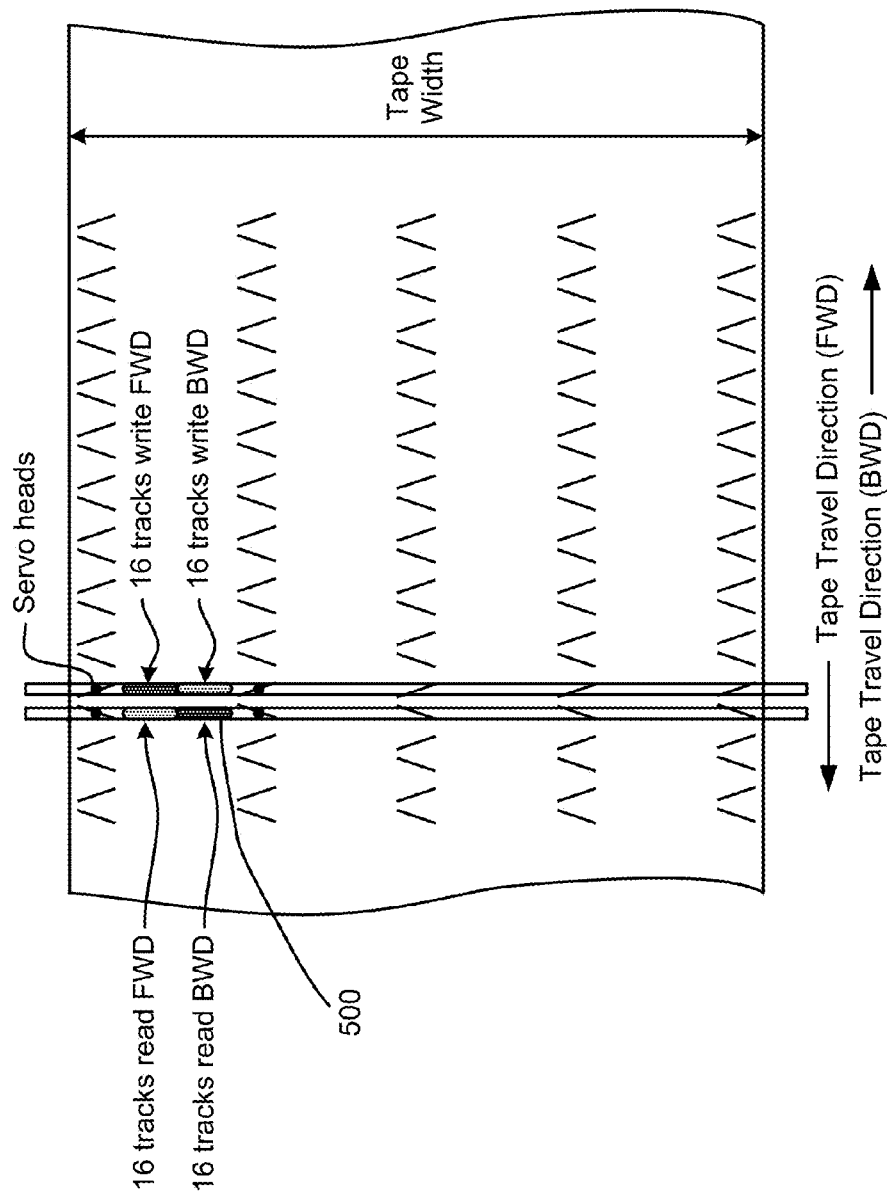
FIG. 5 depicts a simplified schematic diagram of magnetic head and servo pattern according to one embodiment.

This new servo format also allows for different head configurations. For example, a 32 track head 400 can be used to increase the data rate on the media. This head 400 is illustrated in FIG. 4. This method, according to some approaches, may be configured to be backward compatible with either previous LTO or 3592 formats. In some embodiments, the format may be used with a new 16 track head 500 that is shown in FIG. 5, in one embodiment. This head may be configured to have 16 write tracks adjacent to 16 read tracks, in one embodiment. This allows for a symmetric head design where both the left and right side modules can be produced from identical parts, which are inverted with respect to each other in the final product. One write procedure may include writing using the upper 16 tracks on the right side module while reading with the upper 16 tracks on the left side module, in one embodiment. During the forward write operation the upper right side servo head may be used to control track position with the bottom servo serving as the backup element should the top head signal become invalid. In the reverse direction, the bottom 16 write tracks of the left side module may be used to write while the bottom 16 read tracks may be used to read/verify. In addition, the bottom left side servo head may be used for tracking with the top left side being used if the bottom signal is invalid.

One advantage to this method is that the head positions relative to the servo pattern do not change between forward and reverse directions, according to some approaches. This head's format may not be compatible with existing LTO formats in some embodiments. This new 16 track head and new servo format provide a reduced head span and servo to reader span that reduces the TDS component by up to slightly more than 50%. This allows for increased track density as the various tape drive generations are developed. This new 16 track scheme also allows for reduced head complexity and cost and reduced channel electronics complexity and cost.

In addition to the reduced track span, the servo control code can also be implemented to better position the read heads over data. For example, from the 16 track discussion above, if the servo element that is farthest away from the write heads is used during the write or read process, there could be a larger TDS component introduced in the written (or read) track positions due to the larger servo to reader spacing, in some embodiments. If so, then during reading, the servo may be adjusted through an algorithm to offset the head in the direction that improves the read quality of the data tracks. This may be accomplished by adjusting tracking position with an offset that is generated from monitoring the error rate of the top most (track 0) and bottom most (track 15) read error rate so that they are minimized relative to each other.

According to some preferred embodiments, a magnetic recording tape includes a plurality of servo tracks, each servo track comprising a series of magnetically defined bars having an average height of between about 80 microns and about 120 microns, where "about X microns" as used herein indicates X microns±10%. For example, about 80 microns indicates 80 microns±8 microns. In addition, an average stripe angle of the bars is between about 10° and about 25°, where "about X°" indicates X°±5%. For example, about 10° as used herein indicates 10°±0.5°. A stripe angle is measured between a longitudinal axis of each respective bar and a line oriented perpendicular to a direction of tape travel and parallel to a plane of the tape. Also, an average stripe width of the bars as measured perpendicular to the axis of each respective bar is between about 1.0 micron and about 2.2 microns, and an average servo frame length of groups of the bars comprising a servo frame is between about 120 microns and about 180 microns.

In some approaches, the various dimensions recited above may be slightly narrowed to gain further advantages over conventional systems and magnetic tapes. For example, an average height of the bars may be between about 90 microns and about 95 microns, the average stripe angle of the bars may be between about 11° and about 13°, the average stripe width of the bars may be between about 1.1 microns and about 1.4 microns, and the average servo frame length of groups of the bars comprising a servo frame may be between about 140 microns and about 160 microns.

In another preferred embodiment, a magnetic recording tape includes a plurality of servo tracks, each servo track comprising a series of magnetically defined bars having an average height of about 93 microns and an average stripe angle of the bars is about 12°. A stripe angle is measured between a longitudinal axis of each respective bar and a line oriented perpendicular to a direction of tape travel and parallel to a plane of the tape. Also, an average stripe width of the bars as measured perpendicular to the axis of each respective bar is about 1.26 microns, and an average servo frame length of groups of the bars comprising a servo frame is about 152 microns.

According to another embodiment, a magnetic recording tape includes a plurality of servo tracks, each servo track comprising a series of magnetically defined bars having an average height of between about 90 microns and about 95 microns, and an average stripe angle of the bars is between about 11° and about 13°. Also, an average stripe width of the bars is between about 1.1 microns and about 1.4 microns, and an average servo frame length of groups of the bars comprising a servo frame is between about 140 microns and about 160 microns.

Moreover, in some approaches, the average height of the bars may be about 93 microns, and the average stripe angle of the bars may be about 12°.

In further approaches, the average stripe width of the bars may be about 1.26 microns, and the average servo frame length of groups of the bars comprising a servo frame may be about 152 microns.

In another embodiment, a system includes a head, such as a magnetic head (e.g., tunneling magnetoresistance (TMR) effect head, giant magnetoresistance (GMR) effect head, etc.), having at least one servo reader and a linearly-oriented array of data transducers. The data transducers are of a type selected from a group consisting of: readers and writers, i.e., at least some of the data transducers are either readers or writers. In addition, a controller is operative to selectively enable every other transducer of a particular type in the array in a first mode of operation (reading and/or writing, e.g., format), and the controller is operative to selectively enable every transducer of the particular type in the array in a second mode of operation. For example, the controller may have two modes of operation. In the first mode, every other transducer may be operated to write or read. In the second mode, the controller may selectively operate each transducer to write or read.

In some approaches, the array may include writers, where every other writer in the array may be activated in the first mode of operation, and every writer in the array may be activated in the second mode of operation. Further, the head may include a linearly-oriented second array of readers, where every other reader in the second array may be activated in the first mode of operation, and every reader in the second array may be activated in the second mode of operation. This allows read-while-write operation of the head in both modes.

In more approaches, the array may include readers, where every other reader in the array may be activated in the first mode of operation, and every reader in the second array may be activated in the second mode of operation.

In more approaches, the first mode of operation may correspond to a first tape format and the second mode of operation may correspond to a second tape format.

In another embodiment, a system includes a head having at least one servo reader and a linearly-oriented array of data transducers. The data transducers are selected from a group consisting of readers and writers. Also, the system includes a switch operative to selectively enable every other transducer of a particular type in the array in a first mode of operation (reading and/or writing, e.g., format), and the switch is also operative to selectively enable every transducer of the particular type in the array in a second mode of operation. The switch may be in the head, in a cable coupled to the system, on a circuit board, etc.

According to some approaches, the array may include writers, where every other writer in the array may be activated in the first mode of operation, and every writer in the array may be activated in the second mode of operation. In further approaches, the head may include a linearly-oriented second array of readers, where every other reader in the second array may be activated in the first mode of operation, and every reader in the second array may be activated in the second mode of operation. This allows read while write in both modes.

In more approaches, the array may include readers, where every other reader in the array may be activated in the first mode of operation, and every reader in the second array may be activated in the second mode of operation.

According to some embodiments, the first mode of operation may correspond to a first tape format and the second mode of operation may correspond to a second tape format, thereby allowing the system to write and/or read to/from more than one magnetic tape format, which may allow for backward compatibility with conventional tape formats and devices.

In another preferred embodiment, a servo format for a magnetic tape comprises at least two servo tracks written to the magnetic tape, the at least two servo tracks comprising a set of magnetically defined bars. The magnetically defined bars have an average height of between about 80 microns and about 120 microns, an average stripe angle of the bars being measured between a longitudinal axis of each respective bar and a line oriented perpendicular to a direction of tape travel and parallel to a plane of the tape of between about 10° and about 25°, an average stripe width of the bars of between about 1.0 micron and about 2.2 microns, and an average servo frame length of groups of the bars comprising a servo frame of between about 120 microns and about 180 microns.

Of course, any of the embodiments and approaches described above may be included in the description of the servo tape format.

In some embodiments, less expensive drives and/or higher data rate drives may be produced by allowing the for a new format to support 16 data tracks, which is less expensive due to lower cost, size, and complexity of the channel electronics, or 32 data tracks which allows for a 2× data rate improvement at the same tape speed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic recording tape, comprising:
a plurality of servo tracks, each servo track comprising a series of magnetically defined bars,
wherein an average stripe width of the bars is between about 1.0 micron and about 2.2 microns,
wherein an average servo frame length of groups of the bars comprising a servo frame is between about 120 microns and about 180 microns.

2. The magnetic recording tape as recited in claim 1, wherein the average height of the bars is between about 80 microns and about 180 microns.

3. The magnetic recording tape as recited in claim 1, wherein an average stripe angle of the bars is between about 10° and about 25°.

4. The magnetic recording tape as recited in claim 1, wherein the average stripe width of the bars is between about 1.1 microns and about 1.4 microns.

5. The magnetic recording tape as recited in claim 1, wherein the bars in each servo track are grouped into servo frames, the servo frames corresponding to a parameter specified by a servo format.

6. The magnetic recording tape as recited in claim 1,
wherein the average height of the bars is between about 90 and 95 microns,
wherein the average stripe angle of the bars is between about 11° and about 13°.

7. The magnetic recording tape as recited in claim 1, wherein the average stripe width of the bars is between about 1.1 microns and about 1.4 microns.

8. The magnetic recording tape as recited in claim 1, wherein each servo frame is defined by a plurality of the bars that fit within the average servo frame length along one of the servo tracks, wherein the servo frames are Linear Tape Open-compatible servo frames.

9. A system, comprising:
a head having at least one servo reader and an array of data transducers of a type selected from a group consisting of readers and writers; and
a controller operative to selectively enable every other transducer of a particular type in the array in a first mode of operation, and operative to selectively enable every transducer of the particular type in the array in a second mode of operation.

10. The system of claim 9, wherein the array includes writers, every other writer in the array being activated in the first mode of operation, every writer in the array being activated in the second mode of operation.

11. The system of claim 10, wherein the head further includes a second array of readers, every other reader in the second array being activated in the first mode of operation, every reader in the second array being activated in the second mode of operation.

12. The system of claim 9, wherein the array includes readers, every other reader in the array being activated in the first mode of operation, every reader in the second array being activated in the second mode of operation.

13. The system of claim 9, wherein the first mode of operation corresponds to a first tape format and the second mode of operation corresponds to a second tape format.

14. The system of claim 9, further comprising a switch operative to selectively enable every other transducer of the particular type in the array in the first mode of operation, and operative to selectively enable every transducer of the particular type in the array in the second mode of operation.

15. A method for writing and/or reading data on a magnetic tape, the method comprising:
reading at least one of a plurality of servo tracks on the magnetic tape, the servo tracks each comprising a set of magnetically defined bars, the magnetically defined bars having:
an average stripe width of the bars of between about 1.0 micron and about 2.2 microns; and
an average servo frame length of groups of the bars comprising a servo frame of between about 120 microns and about 180 microns.

16. The method of claim 15, wherein the average height of the bars is between about 80 microns and about 180 microns.

17. The method of claim 15, wherein an average stripe angle of the bars is between about 10° and about 25°.

18. The method of claim 15, wherein the average stripe width of the bars is between about 1.1 microns and about 1.4 microns.

19. The method of claim 15, wherein the average servo frame length of groups of the bars comprising a servo frame is between about 140 microns and about 160 microns.

20. The method of claim 15,
wherein the average height of the bars is between about 90 and 95 microns,
wherein the average stripe angle of the bars is between about 11° and about 13°.

* * * * *